United States Patent
Nishigai et al.

[11] Patent Number: 5,825,911
[45] Date of Patent: Oct. 20, 1998

[54] DEVICE FOR ASCERTAINING THE AUTHENTICITY OF AN ARTICLE AND IMAGE FORMING APPARATUS USED FOR PREVENTING BANK BILLS, SECURITIES AND THE LIKE FROM BEING, FORGED

[75] Inventors: Hidefumi Nishigai; Masao Hattori, both of Ebina, Japan

[73] Assignee: Fuji Xerox Co., Ltd., Tokyo, Japan

[21] Appl. No.: 568,297

[22] Filed: Dec. 6, 1995

[30] Foreign Application Priority Data

Dec. 9, 1994 [JP] Japan .................................. 6-306605
Dec. 9, 1994 [JP] Japan .................................. 6-306606

[51] Int. Cl.$^6$ ..................................................... G06K 9/00
[52] U.S. Cl. ............................... 382/135; 356/71; 283/85
[58] Field of Search .................................. 382/317, 135, 382/181, 190; 283/72, 85, 83, 91, 87; 399/366; 194/207; 209/534; 235/379; 356/71; 250/556

[56] References Cited

U.S. PATENT DOCUMENTS

| | | | |
|---|---|---|---|
| 4,386,432 | 5/1983 | Nakamura et al. | 382/135 |
| 4,591,707 | 5/1986 | Stenzel et al. | 283/83 |
| 4,609,207 | 9/1986 | Muck et al. | 283/85 |
| 4,820,912 | 4/1989 | Samyn | 283/83 |
| 5,196,786 | 3/1993 | Usami et al. | 324/765 |
| 5,279,403 | 1/1994 | Harbaugh et al. | 194/207 |
| 5,475,468 | 12/1995 | Natsudaira | 399/9 |

FOREIGN PATENT DOCUMENTS

A-63-501250 5/1988 Japan.
A-6-79991 3/1994 Japan.
A-6-87288 3/1994 Japan.

OTHER PUBLICATIONS

Hecht. *Optics*. $2_{nd}$ Edition. Addison–Wesley Publishing Co. pp. 37–43, 1987.

*Primary Examiner*—Jon Chang
*Attorney, Agent, or Firm*—Oliff & Berrridge, PLC

[57] ABSTRACT

An article 1 to be prevented from forgery previously contains an optical semiconductor, the mixing ratio of which is predetermined. Under the condition that a light source 6 is turned off, microwaves are emitted to the article 1 to be prevented from forgery through a feed phone 5. These microwaves are reflected on the article 1 to be prevented from forgery and supplied to a receiving section 8 through a feed phone 7, so that the receiving level of the microwaves can be measured. Next, the light source 6 is turned on, and the receiving level of the microwaves is measured in the same manner. When an optical semiconductor is irradiated with rays of light, it is excited, so that the microwave reflection factor is enhanced. Accordingly, the receiving level in the case where the light source 6 is turned on is higher than the receiving level in the case where the light source 6 is turned off.

17 Claims, 7 Drawing Sheets

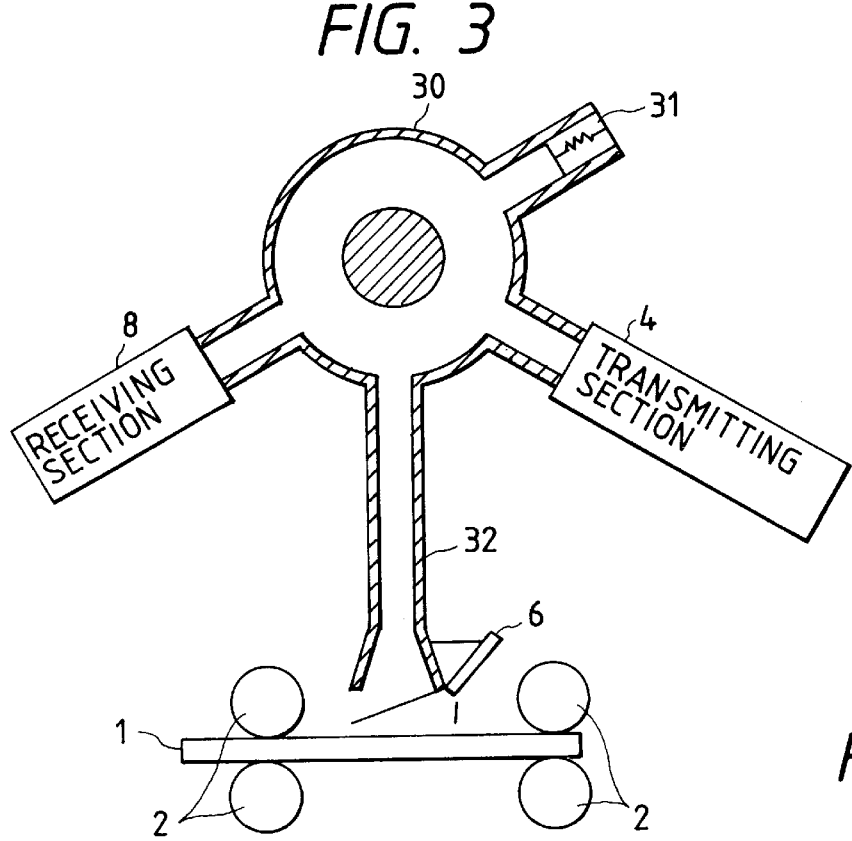
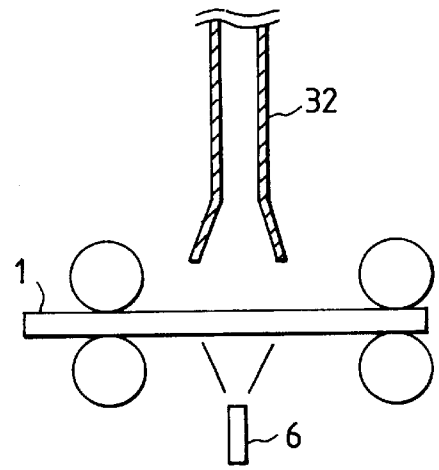
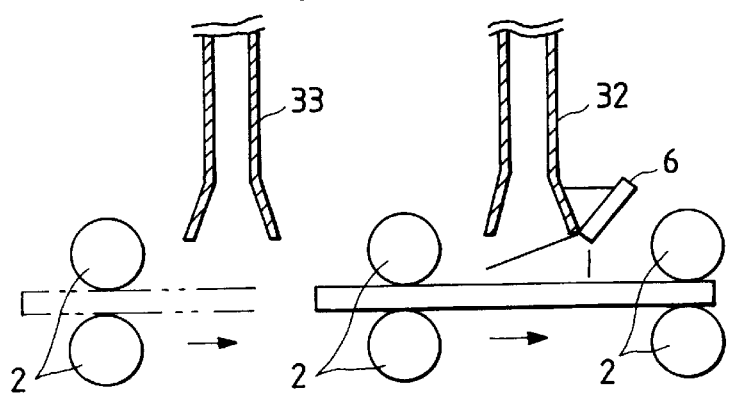

DEVICE FOR ASCERTAINING THE AUTHENTICITY OF AN ARTICLE AND IMAGE FORMING APPARATUS USED FOR PREVENTING BANK BILLS, SECURITIES AND THE LIKE FROM BEING, FORGED

BACKGROUND OF THE INVENTION

1. Field of the Invention

The present invention relates to a device for ascertaining the authenticity of articles suitably used for judging the authenticity of bank bills, securities and the like, and an image forming apparatus suitably used for preventing bank bills, securities and the like from being forged.

2. Description of the Related Art

Recently, there arises a problem about the forgery of bank bills, passports, credit cards, securities, licenses and the like, which will be referred to as articles to be prevented from forgery in this specification hereinafter. In order to prevent forgery, various techniques are proposed to ascertain the authenticity of those articles.

As one of the techniques, there is disclosed a technique in which metallic fibers are contained according to a predetermined distribution pattern in the articles to be prevented from forgery such as bank bills and others, and the authenticity of the articles is ascertained by the distribution pattern (shown in Japanese Patent Unexamined Publication Nos. Sho 63-501250, Hei 6-87288 and Hei 6-79991). According to the above technique, the authenticity of articles to be prevented from forgery is judged as follows. With respect to a wave guide in which microwaves are transmitted, there is provided a slit which crosses the wave guide. An article to be prevented from forgery is inserted into the slit so as to measure a transmission factor of the microwaves. When this article to be prevented from forgery is authentic, the transmission factor must fluctuate in accordance with the above distribution pattern. Therefore, it is possible to judge the authenticity of the article by the fluctuation of the transmission factor.

In the above techniques, metallic fibers are used for forming the predetermined distribution pattern. Since the metallic fibers can be easily obtained, forgeries are easily manufactured. For example, as disclosed in Japanese Patent Unexamined Publication No. 63-501250, metallic fibers are used, the length of which is 0.5 to 1.5 m, and the diameter of which is 2 to 25 $\mu$m. Even when metallic fibers, the dimensions of which are different from the above, are used, the same microwave reflecting characteristic can be easily provided.

As a result of the investigation made by the inventors, the reason why the same microwave reflecting characteristic can be provided by the metallic fibers of different dimensions is that the microwave reflecting characteristic has a tendency to depend upon the length of metallic fibers, so that the microwave reflecting characteristic is not greatly changed even when the diameters are different. Even if the length and material of the metallic fibers used for the forged article are different from those of the authentic article, the same microwave reflecting characteristic as that of the authentic article can be provided when a content of metallic fiber in a predetermined area is appropriately set.

As described above, in the case of conventional articles to be prevented from forgery, it is easy to manufacture forged articles, the microwave reflecting characteristic of which is the same as that of the authentic articles. Accordingly, it is difficult to accurately ascertain the authenticity of forged articles.

Also, the recent progress of color copiers and color printers leads to an increasing danger of the forgery of bank bills, securities, merchandise coupons, entrance tickets to entertainments and others. In order to prevent the forgery, the following technique is widely known. According to the technique, the image patterns of bank bills are previously stored in a memory; image data of a document is collated with the contents of the memory; and when both are similar to each other, image output is not normally conducted, for example, a portion on the copied image concerned is painted black. Alternatively, the following technique is also widely known. A dot pattern, which can not be seen with the naked eye, is contained in the image data to be printed, and the manufacturer's serial number of the copier is represented by this dot pattern, so that the forger can be easily traced.

However, it is difficult to apply the former technique to all documents to be prevented from forgery, because although the types of circulating bank bills are limited, the number of types of merchandise coupons and entrance tickets are very large, so that it can not be realized to store all image patterns of those merchandise coupons and entrance tickets. According to the latter technique, it is easy to trace the forger after the forgery has been completed. However, it is impossible to prevent the illegal forging act.

In this connection, as described above, there is disclosed a technique in which metallic fibers are contained according to a predetermined distribution pattern on bank bills to be prevented from forgery, and the authenticity of the bank bill is ascertained by the distribution pattern (shown in Japanese Unexamined Patent Publication Nos. 63-501250, Hei 6-87288 and Hei 6-79991).

The distribution patterns of metallic fibers of various types of bank bills are different from each other, however, they are common in the viewpoint of reflecting microwaves at a predetermined reflection factor. Accordingly, the following can be considered. In the image reading device used for a copier, a document to be copied is previously irradiated with microwaves, and only when the microwaves are not reflected on the document, the document is read out so as to be copied.

However, in general, articles to be set on the platen glass of a copier are not limited to sheets of paper. For example, metal is vapor-deposited on the cover of a book so that the title can be expressed by gold letters. Sometimes, gold leaves are dispersed on the surface of a picture, and it is necessary to copy a printed board. In the above cases, microwaves are reflected on the metallic portions of the article to be copied. Therefore, it is difficult to discriminate the article to be copied whether or not it is a document to be prevented from forgery.

SUMMARY OF THE INVENTION

The present invention has been accomplished in view of the above problems, and it is one object of the present invention to provide a device for ascertaining the authenticity of an article to be prevented from forgery.

Another object of the present invention is to provide an image forming apparatus in which it can be accurately discriminated whether or not an article is a document to be prevented from forgery.

In order to solve the above problems, the present invention has been achieved by the provision of a device for ascertaining the authenticity of an article comprising: a light source for emitting a beam of light to an article to be inspected; an electromagnetic wave generating means for emitting electromagnetic waves to the article to be inspected; an electromagnetic wave receiving means for receiving the electromagnetic waves which are emitted by the electromagnetic wave generating means and then reflected on and dispersed by or transmitted through the article to be inspected and the electromagnetic wave receiving means for outputting a signal corresponding to a receiving level of the received electromagnetic waves; a lighting means for appropriately turning on and off the light source; and a judging means for judging the authenticity of the article to be inspected according to a receiving level corresponding to a state in which the light source is turned on and also a receiving level corresponding to a state in which the light source is turned off.

Also, in order to solve the above problems, the present invention has been achieved by the provision of an image forming apparatus comprising: a light source for emitting a beam of light to an article to be copied; an electromagnetic wave generating means for emitting electromagnetic waves to the article to be copied; an electromagnetic wave receiving means for receiving the electromagnetic waves emitted by the electromagnetic wave generating means and reflected on the article to be copied and also for outputting a signal corresponding to a receiving level of the received electromagnetic waves; a lighting means for appropriately turning on and off the light source; and a judging means for judging whether the article must be copied or not according to a receiving level corresponding to a state in which the light source is turned on and also according to a receiving level corresponding to a state in which the light source is turned off.

The light source emits a beam of light to an article to be inspected or copied, and the electromagnetic wave generating means emits electromagnetic waves to the article to be inspected or copied. The electromagnetic wave receiving means receives electromagnetic waves which have been reflected, diffused or transmitted by the article to be inspected or copied, and a receiving level of the received electromagnetic waves is outputted by the electromagnetic wave receiving means.

In this case, when the lighting control means controls the light source to be turned on, the electromagnetic wave receiving means outputs a receiving level corresponding to a state in which the light source is turned on. When the lighting control means controls the light source to be turned off, the electromagnetic wave receiving means outputs a receiving level corresponding to a state in which the light source is turned off. According to both receiving levels which have been obtained in the above manner, the judging means ascertains the authenticity of the article to be inspected, or judges whether or not the article must be copied.

BRIEF DESCRIPTION OF THE DRAWINGS

The above and other objects and features of the present invention will be more apparent from the following description taken in conjunction with the accompanying drawings.

FIG. 3 is a cross-sectional view showing the primary portion of one modification of the device for ascertaining the authenticity of articles in accordance with the embodiment of the invention;

FIG. 4 is a cross-sectional view showing the primary portion of another modification of the device for ascertaining the authenticity of articles in accordance with the embodiment of the invention;

FIG. 5 is a cross-sectional view showing the primary portion of still another modification of the device for ascertaining the authenticity of articles in accordance with the embodiment of the invention;

DETAILED DESCRIPTION OF THE PREFERRED EMBODIMENTS

Figure 1:
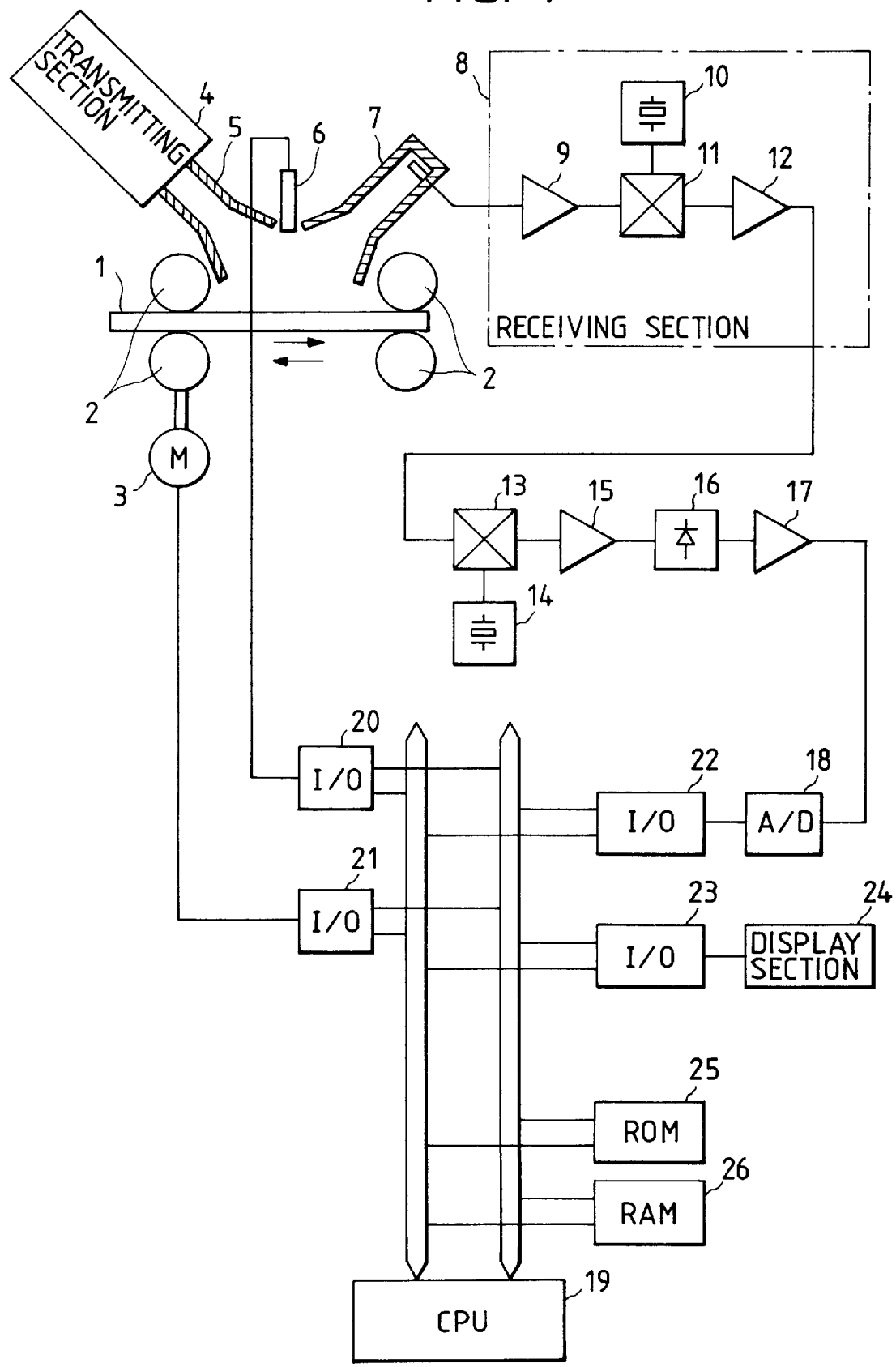
FIG. 1 is a block diagram showing an arrangement of a device for ascertaining the authenticity of articles in accordance with the embodiment of the invention.

Referring to FIG. 1, an embodiment of the present invention will be explained as follows.

In the drawing, reference numeral 1 denotes an article to be prevented from forgery such as a bank bill, a credit card and the like. The article to be prevented from forgery is conveyed by conveyance rollers 2 in the transverse direction in FIG. 1. These conveyance rollers 2 are driven by a motor 3. Reference numeral 4 denotes a transmitting section by which microwaves of a predetermined frequency are generated. These microwaves are emitted to the article 1 to be prevented from forgery through a feed phone 5. Reference numeral 6 denotes a light source which is composed of an electric bulb or a semiconductor laser.

Reference numeral 8 denotes a receiving section which receives the microwaves reflected on or diffused by the article 1 to be prevented from forgery via a feed phone 7. In the receiving section 8, there is provided a microwave amplifier 9, which supplies the microwave received via the feed phone 7 to a first mixer 11. Reference numeral 10 denotes a local oscillator, which supplies a carrier of a predetermined frequency to the first mixer 11. Due to the foregoing structure, a frequency of the microwaves supplied to the first mixer 11 is converted into a first intermediate frequency. Reference numeral 12 denotes a first intermediate frequency amplifier, which amplifies a signal, the frequency of which has been converted into the first intermediate frequency.

Reference numeral 14 denotes a second local amplifier. Reference numeral 13 denotes a second mixer, which converts the signal, the frequency of which has been converted into the first intermediate frequency, into the second intermediate frequency. A signal of this second intermediate frequency is detected by a detection circuit 16 and amplifier by a low frequency amplifier 17 and then outputted as a detection signal $S_1$. Accordingly, a level of the detection signal $S_1$ is proportional to a level of RF of the microwaves inputted into the receiving section 8. Reference numeral 18 denotes an A/D converter, which converts the detection signal $S_1$ into a digital signal and then outputs the thus obtained digital signal.

Reference numeral 19 denotes a CPU, which controls other components in accordance with a control program stored in ROM 25. Reference numeral 26 denotes a RAM, which stores various variables used in the above control program. Reference numeral 20 denotes an interface circuit, which turns on and off the light source 6 under the control of CPU 19. Reference numeral 21 denotes a motor interface circuit, which drives the motor 3 under the control of CPU 19. Reference numeral 22 denotes a receiving interface circuit, which appropriately supplies the detection signal $S_1$ received via the A/D converter 18 to CPU 19. Reference numeral 23 denotes a display interface circuit, which displays various information on the display 24 under the control of CPU 19.

Next, the physical structure of the article to be prevented from forgery which is applied to this embodiment will be explained as follows. In the article 1 to be prevented from forgery which is applied to this embodiment contains an optical semiconductor by some means. Examples of the articles 1 to be prevented from forgery are: a credit card, in the resin of which particles of an optical semiconductor are dispersed; a document coated with an optical semiconductor; and securities printed with ink containing an optical semiconductor. When the optical semiconductor is irradiated with rays of light of a predetermined wave length, it is excited, so that the electric conductivity is increased. Accordingly, in one case, under the condition that the optical semiconductor is irradiated with rays of light, the article 1 to be prevented from forgery is exposed to microwaves, and in the other case, under the condition that the optical semiconductor is not irradiated with rays of light, the article 1 to be prevented from forgery is also exposed to microwaves. When the levels of the reflecting waves in both cases are compared with each other, it can be discriminated whether or not the predetermined optical semiconductor is contained in a document.

Figure 2:
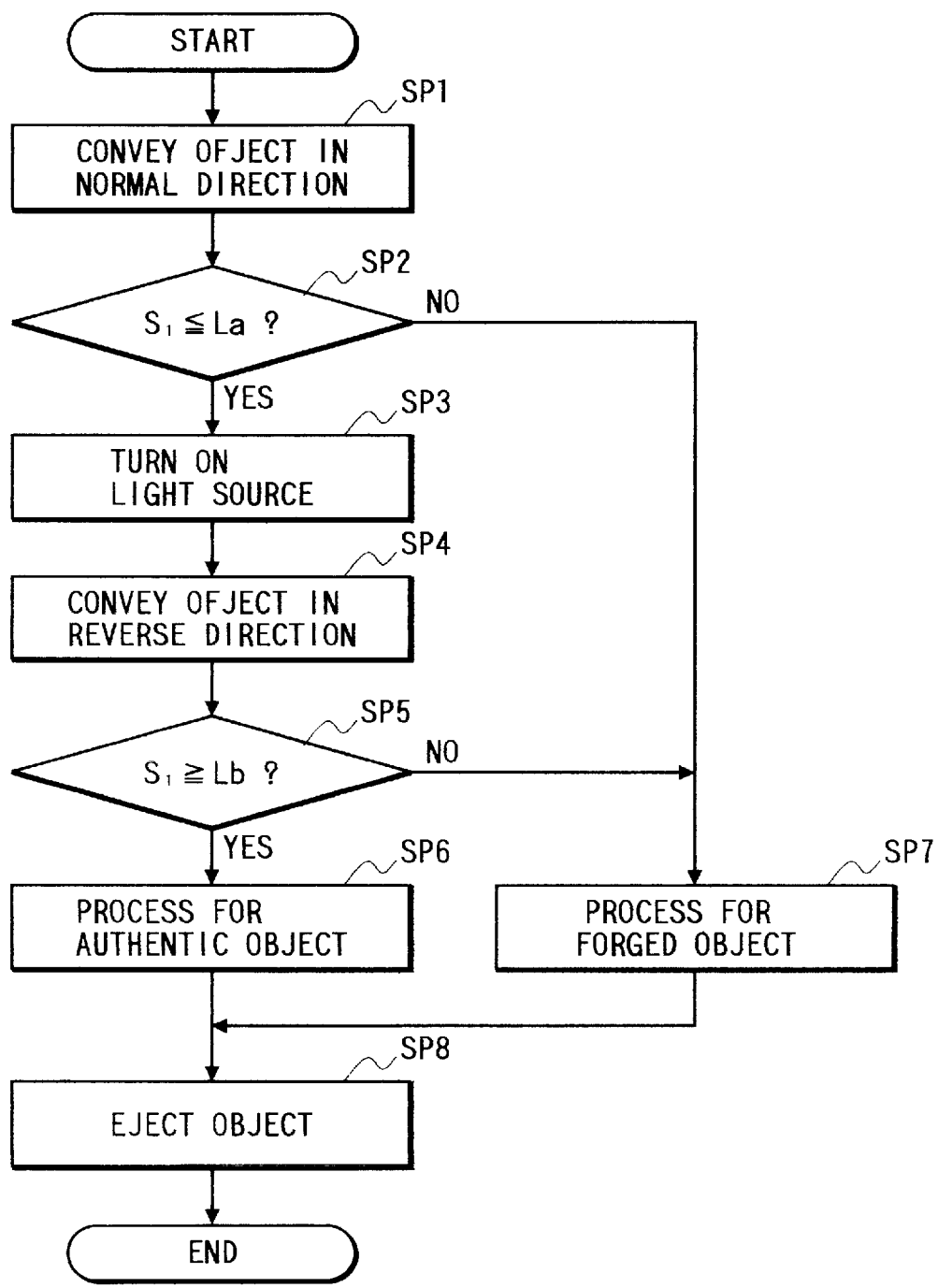
FIG. 2 is a flow chart showing the control program of the device for ascertaining the authenticity of articles in accordance with the embodiment of the invention.

Next, referring to FIG. 2, operation in this embodiment will be explained as follows.

First, an article 1 to be prevented from forgery is set at a predetermined insertion hole not shown in the drawing. Then the processing shown in FIG. 2 is started. When the process advances to step SP1, the motor 3 is driven by the control of CPU 19. Therefore, the article 1 to be prevented from forgery is conveyed in a normal direction (to the left in FIG. 1) by the conveyance rollers 2. At this time, the article 1 to be prevented from forgery is irradiated with microwaves by the transmitting section through the feed phone 5. At this point of time, the light source 6 is turned off.

Next, when the process advances to step SP2, it is judged whether or not the detection signal $S_1$ is not more than a predetermined level $L_a$. In this case, the article 1 to be prevented from forgery has a microwave reflection factor by which a detection signal $S_1$ not more than the predetermined value $L_a$ can be provided when the light source 6 is turned off, and the article 1 to be prevented from forgery has a microwave reflection factor by which a detection signal $S_1$ not less than the predetermined value $L_b$ can be provided when the light source 6 is turned on. In this case, $L_a < L_b$. Consequently, when the article 1 to be prevented from forgery is authentic, the detection signal $S_1$ is not more than $L_a$, and it is judged to be "YES". Therefore, the process advances to step SP3.

Next, in step SP3, the light source 6 is turned on. In step SP4, the motor 3 is reversed, so that the article 1 to be prevented from forgery is conveyed in the reverse direction (to the right in FIG. 1). When the process advances to step SP5, it is judged whether or not the detection signal $S_1$ is not less than a predetermined value $L_b$. Since the light source 6 is turned on at this time, the optical semiconductor in the article 1 to be prevented from forgery is excited. Accordingly, since the detection signal $S_1$ is not less than the predetermined value $L_b$, it is judged to be "YES", and the process advances to step SP6.

Figure 6:
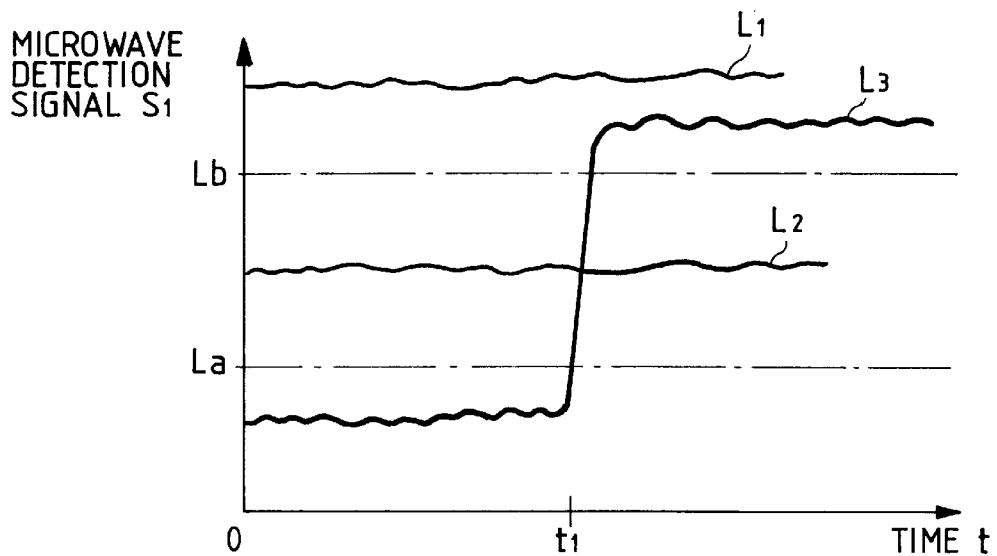
FIG. 6 is a wave shape diagram showing a detection signal $S_1$.

In step SP6, processing is conducted in accordance with the authentic article 1 to be prevented from forgery. The content of this processing is different according to the use of the article 1 to be prevented from forgery. For example, in the case where the article 1 to be prevented from forgery is a credit card, money transaction is conducted. Next, when the process advances to step SP8, the article 1 to be prevented from forgery is ejected, and the light source 6 is turned off. In this connection, a wave form of the detection signal $S_1$ in the series of the above processing is shown by the characteristic $L_3$ in FIG. 6. In the diagram shown in FIG. 6, a point of time at which the above step SP3 is carried out, that is, a point of time at which the light source 6 is turned on is represented by $t_1$.

On the other hand, operation will be explained as follows in the case where a forged article is set at the insertion hole. When a forged article is made by dispersing metallic fibers in the resin or paper, the detection signal $S_1$ exhibits the characteristics $L_1$ and $L_2$ shown in FIG. 6. According to these characteristics, it is necessarily judged to be "NO" in either step SP2 or SP5, and the process advances to step SP7. In this step, the processing corresponding to the forged article is conducted, for example, the commercial transaction is stopped or alternatively a buzzer rings at the device. In this way, the forged article is ejected from the device in step SP8.

In general, it is very difficult to forge an article by dispersing an optical semiconductor in the resin or paper. The reason is described below.

(1) There are many types of optical semiconductors, however, it is necessary to select an optical semiconductor which is excited with respect to the wave length of rays of light emitted by the light source 6. Consequently, a forger needs to know in advance the wave length of the light source 6 or the composition of the optical semiconductor.

(2) Even if the composition of the optical semiconductor composing the authentic article leaks out to a forger, it is necessary to provide a large-scale apparatus to actually manufacture an optical semiconductor in accordance with that composition.

(3) It is necessary for a forger to disperse the optical semiconductor in the forged article by an appropriate concentration. That is, when the concentration of the optical semiconductor is lower or higher than a predetermined value, the wave form of the detection signal $S_1$ is deformed in such a manner that the characteristic $L_3$ is shifted in the upward and downward direction. Accordingly, it is judged to be "NO" in step SP2 or SP5.

As described above, according to this embodiment of the invention, the authenticity of the article 1 to be prevented from forgery is judged by the detection signal $S_1$ when the light source 6 is turned on and also when the light source 6 is turned off. Accordingly, it is very difficult to forge the article, and the result of judgment is very accurate.

It should be noted that the present invention is not limited to or by the above specific embodiment. For example, variations may be made as follows by one skilled in the art without departing from the scope of the invention.

(1) In the above embodiment, alterations in the arrangement may be made in the transmitting section 4, feed phone 5, light source 6, feed phone 7 and receiving section 8 as shown in FIG. 3. In the drawing, reference numeral 30 is a rat race circuit, which is connected with the transmitting section 4, receiving section 8, non-reflective terminal resistor 31 and feed phone 32.

Half of the microwaves outputted by the transmitting section 4 are absorbed by the non-reflective terminal resistor 31, and the other half of the microwaves outputted by the transmitting section 4 are emitted to the article 1 to be prevented from forgery. Then the microwaves reflected on or dispersed by the article 1 to be prevented from forgery are incident upon the rat race circuit 30 through the feed phone 32, and then half of the microwaves are absorbed by the non-reflective terminal resistor 31, and the other half of the microwaves are received by the receiving section 8.

(2) In the case where the article 1 to be prevented from forgery is a bank bill through which rays of light are transmitted, the light source 6 may be arranged below the article 1 to be prevented from forgery as shown in FIG. 4 so that rays of light can be emitted by the light source 6.

(3) In the above embodiment, when the light source 6 was changed over between the states of turning on and off and the motor 3 was appropriately reversed, the authenticity of the article 1 to be prevented from forgery was ascertained. However, the following variation may be made. Two systems of the microwave transmitting and receiving sections are provided, and the direction of conveyance of the articles 1 is fixed to one direction, and the light source 6 is turned on at all times. An example of this arrangement is shown in FIG. 5.

In the drawing, the conveyance rollers 2 convey the article 1 to be prevented from forgery only in one direction (to the right in the drawing). Reference numeral 33 is a feed phone, at the upper portion of which the same circuit as that shown in FIG. 3 is provided, however, the light source 6 is not provided in this case. Accordingly, in this portion, it is possible to obtain the detection signal $S_1$ in the case where rays of light are not emitted to the article 1 to be prevented from forgery.

There is provided a light source 6 at the opening of the feed phone 32, and this light source 6 is always maintained in a lighting condition. Reference numeral 32 is a feed phone, at the upper portion of which the same circuit as that shown in FIG. 3 is provided. Accordingly, in this portion, it is possible to obtain the detection signal $S_1$, in the case where rays of light are emitted to the article 1 to be prevented from forgery.

Since a plurality of articles 1 to be prevented from forgery can be continuously conveyed by the structure described above, this embodiment is suitably used when a large number of articles 1 to be prevented from forgery are inspected in a short period of time.

Figure 7:
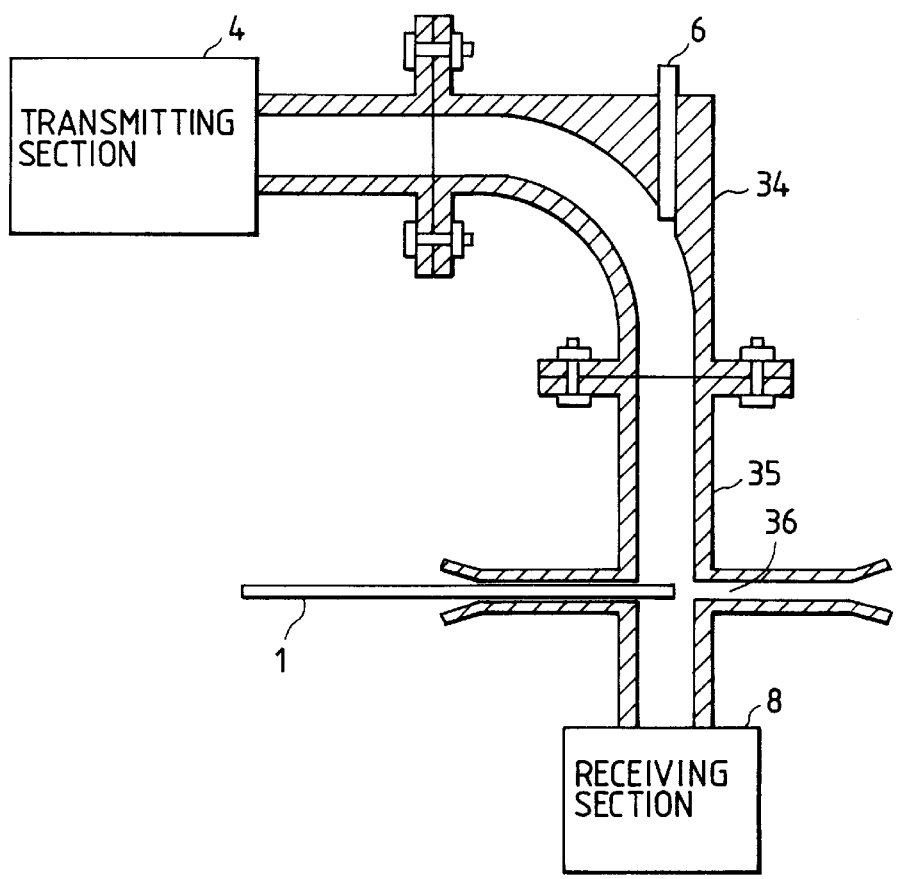
FIG. 7 is a cross-sectional view showing the primary portion of yet still another modification of the device for ascertaining the authenticity of articles in accordance with the embodiment of the invention.

(4) In the above embodiment, the microwaves reflected on or dispersed by the article 1 to be prevented from forgery are received by the receiving section 8. However, the device may be composed in such a manner that the microwaves which have been transmitted through the article 1 to be prevented from forgery are received. An example of the aforementioned arrangement is shown in FIG. 7. In the drawing, the microwaves outputted from the transmitting section 4 are supplied to the receiving section 8 successively through an elbow 34 and a wave guide 35. In this structure, there is provided a slit 36 in the wave guide 35, into which the article 1 to be prevented from forgery is appropriately inserted. The light source 6 to emit rays of light to the article 1 to be prevented from forgery is embedded in the elbow 34.

(5) In the above embodiment, microwaves are used as electromagnetic waves. However, it should be noted that the electromagnetic waves are not limited to microwaves.

(6) In the above embodiments and variations, the optical semiconductor dispersed in the article 1 to be prevented from forgery may be formed into the shape of a bar code, and the authenticity of the article 1 to be prevented from forgery may be ascertained by whether or not the detection signal $S_1$ is obtained in accordance with this bar code.

The structure of a document reading device which is another embodiment of the present invention will be explained below. In this connection, this document reading device is applied to a color copier.

Figure 8:
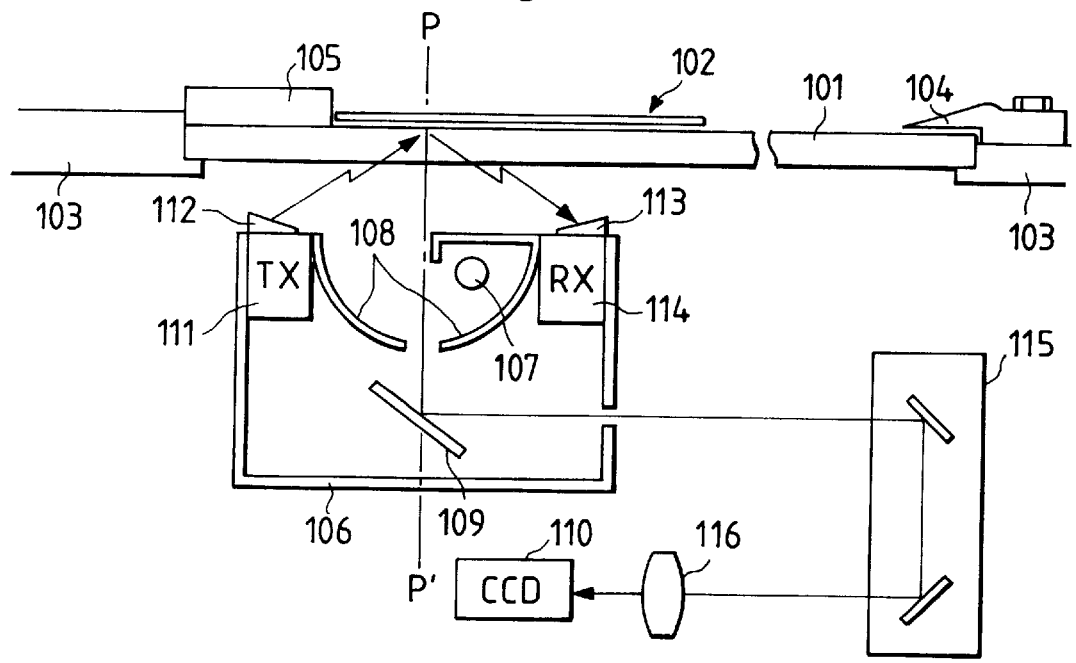
FIG. 8 is a front view showing a document reading device used in an image forming apparatus in accordance with an embodiment of the invention.

Referring to FIG. 8, reference numeral 101 denotes a platen glass, which is arranged at a predetermined position on a glass frame 103. Reference numeral 104 denotes a glass holding member, which fixes the platen glass 101 to the glass frame 103. Reference numeral 105 denotes a registration guide, on the upper surface of which marks of the positions at which documents 102 are placed are printed according to various document sizes. Reference numeral 106 denotes a lamp carriage, which can be moved in parallel with the platen glass 101. On the lamp carriage 106, there is provided a lamp 107, which emits a ray of light to the document 102.

The ray of light emitted by the lamp 107 is reflected on the document 102. Then the ray of light is transmitted to a full-rate mirror 109 along the optical axis P–P'. After the ray of light has been reflected on the full-rate mirror 109, it is reflected on a half-rate mirror 115 and refracted by a lens 116 and then inputted into CCD line sensor 110. Reference numeral 111 denotes a transmitting section which outputs microwaves of a predetermined level. These microwaves are emitted to the platen glass 101 by a transmitting antenna 112. In this connection, directivity of the transmitting antenna 112 is set so that a gain of the antenna can be most enhanced in the direction of a light illuminating position which is an intersection where the optical axis P–P' crosses an upper surface of the platen glass 101.

Next, the physical structure of the article 101 to be prevented from the forgery applied to this embodiment will be explained as follows. Examples of the articles 101 to be prevented from the forgery are: credit cards, in the resin of which particles of optical semiconductor are dispersed by an appropriate means; documents coated with optical semiconductor; and securities printed with ink which contains optical semiconductor. The optical semiconductor is defined as a substance which is excited when it is irradiated with rays of light, the wave-length of which coincides with the wave-length of the substance, so that the electric conductivity of the substance can be increased. When the optical semiconductor is irradiated simultaneously with microwaves and rays of light, a quantity of reflected microwaves are increased. In the present invention, this characteristic is utilized. According to the present invention, operation is conducted as follows. In the process of copying, an article to be copied is irradiated with microwaves. The level of reflected microwaves in the case where rays of light are irradiated simultaneously with the microwaves is compared with the level of reflected microwaves in the case where rays of light are not irradiated. When the above comparison is made, it is possible to discriminate whether or not the article to be copied contains an optical semiconductor. When the article to be copied contains the optical semiconductor, it is an article to be prevented from the forgery. Therefore, copying operation is immediately stopped.

Both inorganic and organic semiconductor can be used as the optical semiconductor to be contained in the article 101 to be -prevented from the forgery. As long as the spectral sensitivity of the semiconductor corresponds to the rays of light emitted by the light source, the semiconductor can be used.

Materials used for an inorganic photoreceptor for copier use can be applied to the inorganic semiconductor of this embodiment. Examples of usable inorganic semiconductors are: (1) group VI such as Se and Te, and their chemical compound semiconductors; (2) group IV such as Si, Ge and Sn, and their chemical compound semiconductors; (3) groups III to V such as GaAs and InP, and their chemical compound semiconductors; and (4) groups II to IV such as ZnO, ZnSe and CdS, and their chemical compound semiconductors.

The above elements and compounds may be both crystalline and amorphous.

Materials used for an organic photoreceptor (OPC) can be applied to the organic semiconductor of this embodiment. Examples of usable organic semiconductors are: (1) azo pigments such as mono-azo pigment, bis-azo pigment, tris-azo pigment and tetra-azo pigment; (2) perylene pigments such as perylene acid anhydride and perylene acid imide; (3) polycyclic quinone pigments such as anthraquinone derivative, anthanthrone derivative, dibenzopyrenequinone derivative, pyranthrone derivative, violanthrone derivative, and isoviolanthrone derivative; (4) indigo pigments such as indigo derivative and thioindigo derivative; (5) metallic phthalocyanine pigments such as copper phthalocyanine and titanyl phthalocyanine, and non-metallic phthalocyanine pigments; (6) carbonium pigments such as diphenylmethane pigment, triphenylmethane pigment, xanthene pigment, and acridine pigment; (7) quinoneimine pigment such as azine pigment, oxazine pigment and thiazine pigment; (8) methine pigment such as cyanin pigment and azomethine pigment; (9) quinoline pigment; (10) benzoquinone and naphthoquinone pigments; (11) naphthalimide pigments; (12) perynon pigments such as bisbenzoimidazole derivative; (13) azulenium pigments; (14) squarium pigments; (15) eutectic complex composed of pyrylium/thiopyrylium dye and polycarbonate compounds; and (16) charge-transfer complex of electron-accepting compounds having electron-accepting substituent groups such as a nitro group, nitroso group and cyano group, and of electron-donating compounds having electron-donating substituent groups such as an amino group, phenyl group, alkyl group and heterocyclic group. In the above pigments, azo pigment, perylene pigment, polycyclic quinone pigment and phthalocyanine pigment are excellent in photoconductivity and weather resistance, so that they are preferably used. Since they are coloring materials having specific colors, a pigment of a predetermined color may be selected when it is used in paint or ink. When the pigment is put into practical use, it may be used together with a coloring material having no photoconductivity.

When these pigments are made into paint or ink, they are dispersed into an appropriate binder resin. In the case of a card, these pigments may be directly dispersed into a plastic material to be used as the base. In this case, it is preferable that the dispersion ratio is 5 to 100 weight percent with respect to the binder resin or base plastic material.

Figure 9:
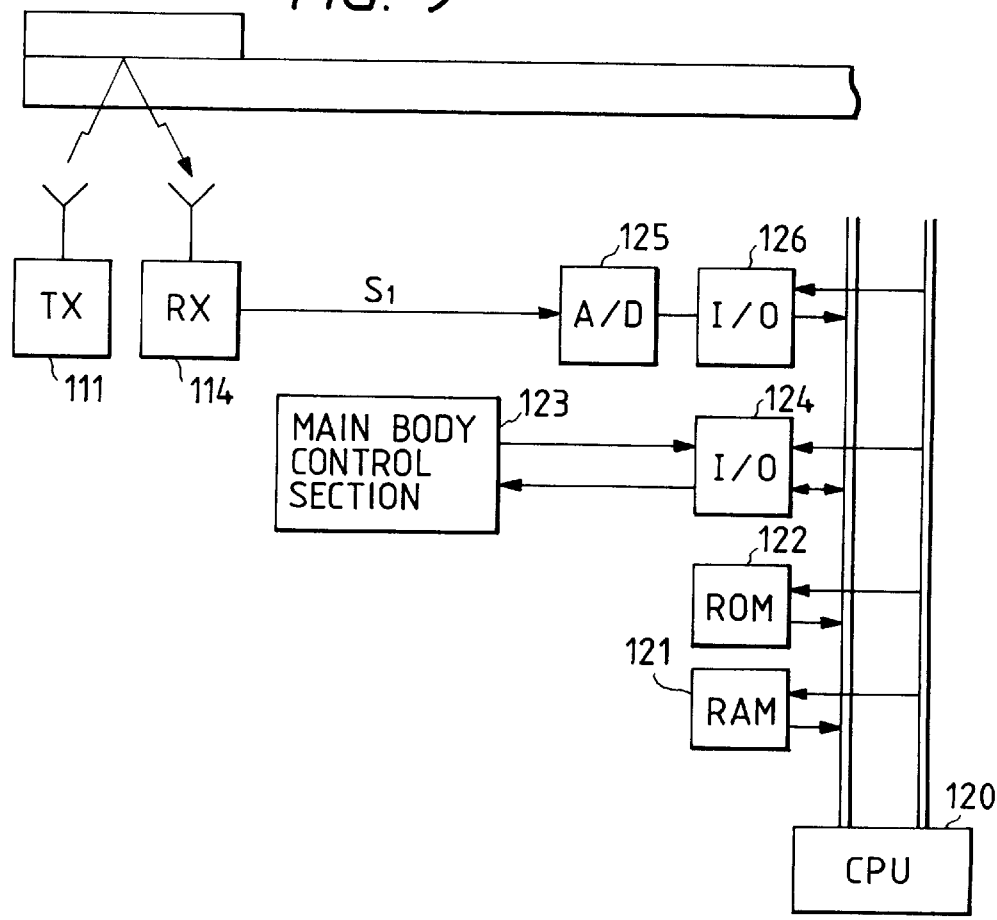
FIG. 9 is a block diagram showing the document reading device shown in FIG. 8.

Next, referring to FIG. 9, an electric structure of the above document reading device will be explained as follows.

In the drawing, reference numeral 120 denotes a CPU, which controls other components provided in the document reading device in accordance with the control program stored in ROM 122. Reference numeral 121 denotes a RAM, in which reading and writing can be freely conducted under the control of CPU 120. In RAM 121, various types of variables used for the control program are stored. Reference numeral 125 denotes an A/D converter, which converts the detection signal $S_1$ into a digital signal. The thus obtained digital signal is sent to CPU 120 through the input and output control section 126. Reference numeral 123 denotes a main body control section, which controls the operation of the entire copier. Reference numeral 124 denotes an input and output control section, which inputs and outputs various signals between the main body control section 123 and CPU 120.

Next, the physical structure of the document to be prevented from forgery which is applied to this embodiment will be explained as follows. In the document to be prevented from forgery which is applied to this embodiment contains an optical semiconductor by some means. Examples of the documents to be prevented from forgery are: a document, in the fibers of which particles of an optical semiconductor are dispersed; a document coated with an optical semiconductor; and a document printed with ink containing an optical semiconductor. When the optical semiconductor is irradiated with rays of light of a predetermined wave length, it is excited, so that the electric conductivity is increased. Accordingly, in one case, under the condition that the optical semiconductor is irradiated with rays of light, the document is exposed to microwaves, and in the other case, under the condition that the optical semiconductor is not irradiated with rays of light, the document is also exposed to microwaves. When the levels of the reflecting waves in both cases are compared with each other, it can be discriminated whether or not the predetermined optical semiconductor is contained in the document.

In this case, the wave length of light which excites the optical semiconductor is different according to the type of the optical semiconductor. When the type of the optical semiconductor is selected so that the wave length of light which excites the optical semiconductor coincides with the wave length of light emitted by the lamp 107, it is possible to excite the optical semiconductor by the lamp 107. In other words, in this case, it is not necessary to provide a new light source for exciting the optical semiconductor.

Next, operation conducted in the embodiment will be explained as follows.

Figure 10:
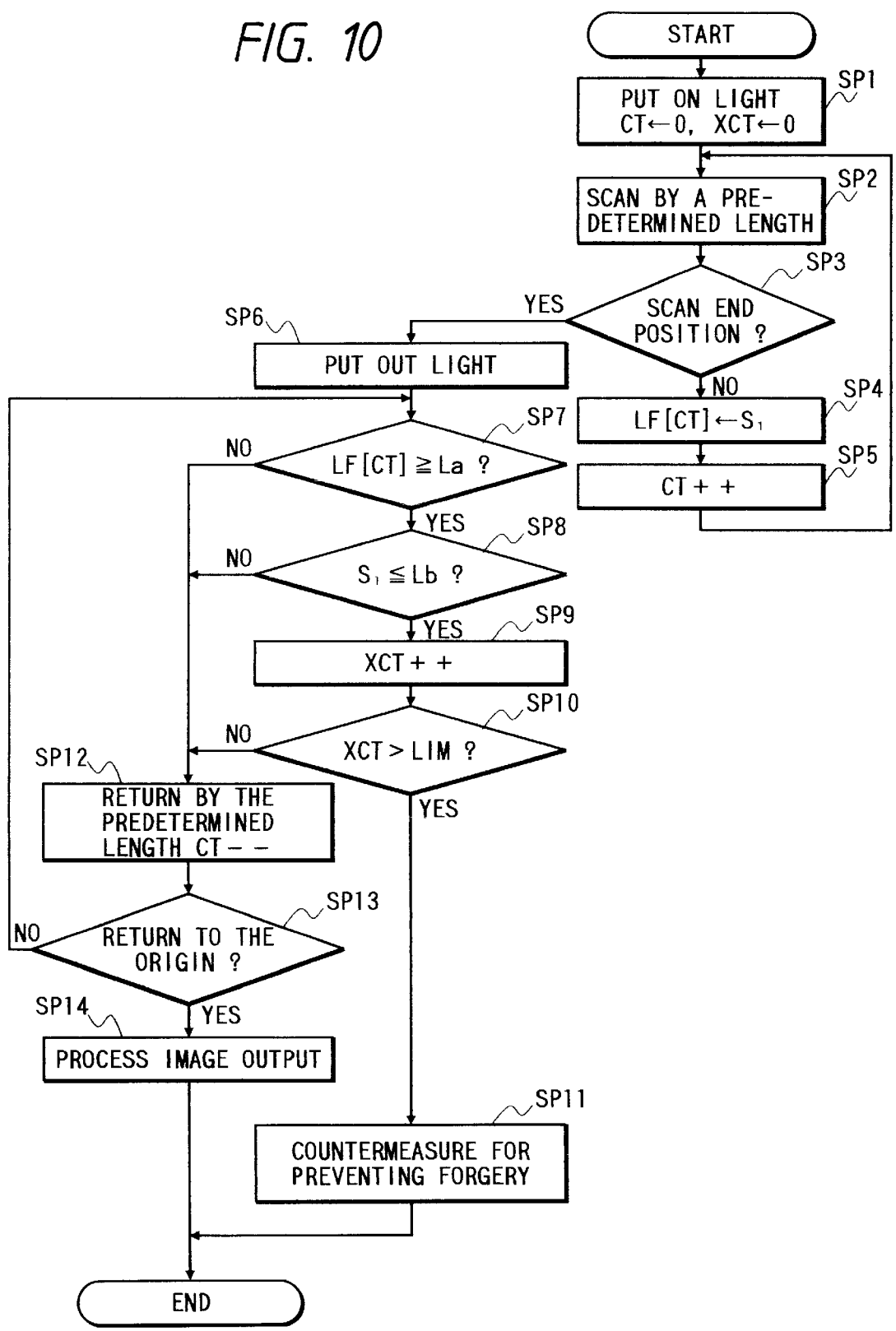
FIG. 10 is a flow chart showing the control program of the document reading device shown in FIG. 8.

First, the start button of the copier is pressed. Then the main body control section 123 gives a command of reading a document to CPU 120. When this command is received by CPU 120, the program shown in FIG. 10 is started by CPU 120. When the processing starts, in step SP1, the lamp carriage 106 is moved to the origin which is a position where the full-rate mirror 109 comes right below the registration guide 105. Next, the lamp 107 is turned on, and the number "0" is substituted into the variables CT and XCT. Then, microwaves are transmitted through the transmitting section 111 and the transmitting antenna 112.

Next, the process advances to step SP2. Then, the lamp carriage 106 is moved in the subsidiary scanning direction (to the right in FIG. 8) by a predetermined length (for example, several mm) at a constant speed. During this period of time, a ray of light emitted by the lamp 107 is reflected on the two reflecting boards 108, document 102 and full-rate mirror 109 and inputted into CCD line sensor 110. CCD line sensor 10 outputs image data in accordance with the intensity of inputted light. The receiving section 114 detects the received microwaves and outputs the detection signal $S_1$. Next, the process advances to step SP3. Then, it is judged whether or not the present lamp carriage 108 position is a predetermined scanning end position.

When it is judged to be "NO", the process advances to step SP4, and the detection signal $S_1$ is substituted into the variable LF[CT]. In this case, the variable LF[CT] is a component CT in the arrangement LF. In this specification, "the component Y in the arrangement X" is expressed by "the variable X[Y]". Since the variable CT is initially set at "0" in step SP1, the detection signal $S_1$ is substituted into the variable LF[0]. Next, the process advances to step SP5, and then the variable CT is increased by an increment "1". After the above processing has been completed, the process returns to step SP2.

Next, in step SP2, the lamp carriage 106 is moved in the subsidiary direction by a predetermined length at a constant speed. When the process advances to step SP4 through step SP3, the detection signal $S_1$ is substituted into the variable LF[CT] (the variable LF[1]). In the same manner, the lamp carriage 106 is moved in the subsidiary direction by the predetermined length, and the detection signal $S_1$ in each portion is successively substituted into the variable LF[CT] (CT=0, 1, 2 . . . ).

After the lamp carriage 106 has reached the scanning end position, the process advances to step SP3. In step SP3, it is judged to be "YES", and the process advances to step SP6. The variable CT in this case will be referred to as "$CT_{MAX}$" in this specification, hereinafter. In the same manner as that of the conventional copier, rays of light incident upon CCD line sensor 10 until the lamp carriage 106 reaches the scanning end position are successively converted into image data and accumulated in the image memory (not shown in the drawing) provided in the copier main body.

Figure 11A:
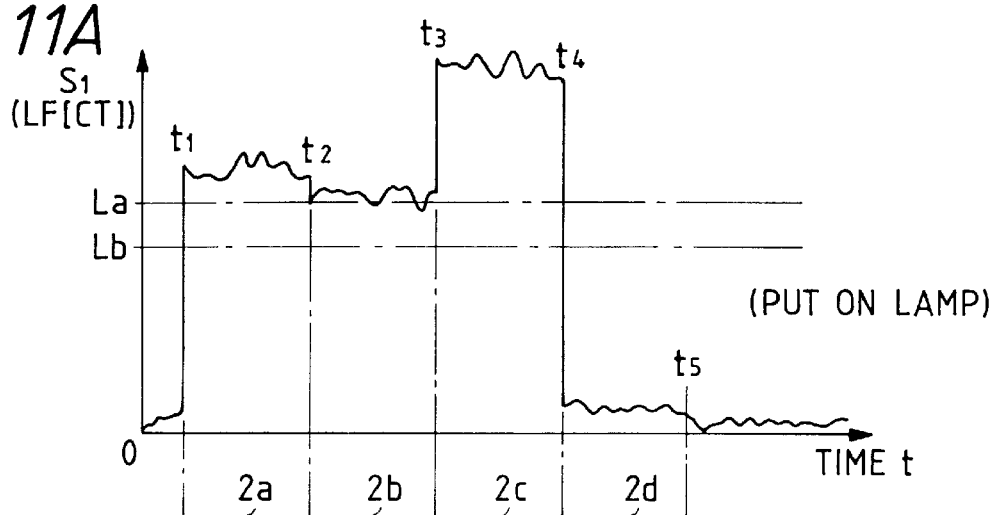
FIGS. 11A to 11C are explanatory views of the operation of the document reading device shown in FIG. 8.
Figure 11B:
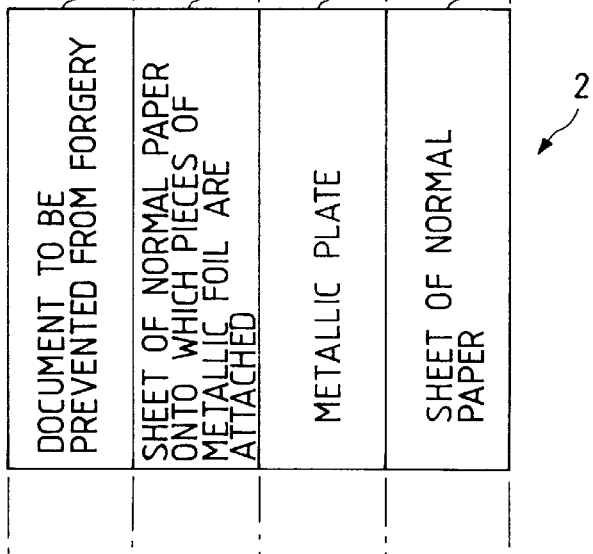

In this case, the composition of the document 102 is shown in Fig. 11B. In the drawing, reference numeral 102a denotes a document to be prevented from forgery, which is a rectangular sheet of paper on which an optical semiconductor is dispersed. The document 102a to be prevented from forgery has a microwave reflection factor by which a detection signal $S_1$ not less than a predetermined value $L_a$ can be provided when the lamp 107 is put on and also by which a detection signal $S_1$ not more than a predetermined value $L_b$ can be provided when the lamp 107 is put out. In this case, $L_a>L_b$. Reference numeral 2b denotes a sheet of normal paper on which pieces of metallic foil are attached. That is, dot-shaped pieces of metallic foil are fixed onto the surface of the sheet of normal paper. This sheet of normal paper has a microwave reflection factor by which the same detection signal $S_1$ as the predetermined value $L_a$ can be provided.

Reference numeral 102c denotes a metallic plate, the microwave reflection factor of which is high, and the detection signal $S_1$ is higher than the predetermined value $L_a$ irrespective of the condition of the lamp 107 which is put on or out. Reference numeral 102d denotes a sheet of normal paper, the microwave reflection factor of which is low, and the detection signal $S_1$ is lower than the predetermined value $L_b$ irrespective of the condition of the lamp 107 which is put on or out. The document 102 is composed of the above portions 102a to 102d which are arranged in order. Accordingly, when the document 102 is scanned by the lamp carriage 106, the detection signal S1 shown in FIG. 11A is obtained, and the result of sampling of the detection signal $S_1$ is stored by the variable LF[CT].

Referring back to FIG. 10, when the process advances to step SP6, the lamp 107 is put out. Next, when the process advances to step SP7, it is judged whether or not the variable LF[CT] exceeds the predetermined value $L_a$. In this case, the variable LF[CT] is the variable LF[$CT_{MAX}$] which was finally set in step SP4. According to the graph shown in FIG. 11A, after the time $t_4$, the detection signal $S_1$ and the corresponding variable LF[CT] are always lower than the predetermined value $L_a$. Consequently, it is judged to be "NO" here, and the process advances to step SP12. In step SP12, the lamp carriage 106 is returned toward the origin by a predetermined distance which is the same as the scanning distance in step SP2, and the variable CT is decreased by a decrement "1".

Figure 11C:
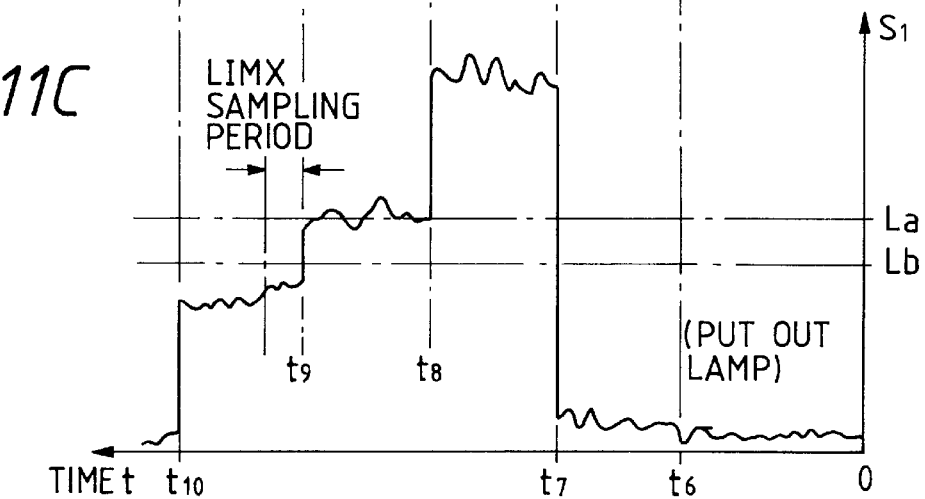

Next, when the process advances to step SP13, it is judged whether or not the lamp carriage 106 has been returned to the origin. Since the lamp carriage 106 has not yet been returned to the origin at this point of time, it is judged to be "NO", and the process returns to step SP7. After that, a loop composed of steps SP7, SP12 and SP13 is repeated, and each time step SP12 is carried out, the lamp carriage 106 is returned toward the origin by the predetermined distance, so that the variable CT is decreased by a predetermined decrement. Even while this processing is being carried out, microwaves are emitted by the transmitting section 111 through the transmitting antenna 112, and the detection signal $S_1$ corresponding to the receiving level is outputted from the receiving section 114. The level of this detection signal $S_1$ is shown in Fig. 11C which corresponds to FIGS. 11A and 11B.

When step SP12 is repeated as described above, the lamp carriage 106 reaches a portion composed of the metallic plate 102c in a short time, and the detection signal $S_1$ is sharply raised. In the state shown in Fig. 11C, the detection signal $S_1$ is sharply raised immediately after the time $t_7$. Next, the process returns to step SP7, and the level of the variable LF[CT] is compared with the level of the predetermined value $L_a$. The variable LF[CT] at this point of time is obtained by sampling the detection signal $S_1$ immediately before the time $t_4$ shown in Fig. 11A. The level of the variable LF[CT] is higher than the level of the predetermined value $L_a$. Consequently, it is judged to be "YES" here, and the process advances to step SP8.

In step SP8, it is judged whether or not the detection signal $S_1$ is lower than the predetermined value $L_b$. As described above, at this point of time, the detection signal $S_1$ is raised, so that the detection signal $S_1$ is higher than the predetermined value $L_b$. Accordingly, it is judged to be "NO" here, and the process advances to step SP12. After that, a loop composed of steps SP7, SP8, SP12 and SP13 is repeated until the time $t_8$.

Next, in the period of time from $t_8$ to $t_9$ with respect to the variable LF[CT] corresponding to the sheet of normal paper $102_b$ onto which pieces of metallic foil are attached, the judgment of step SP7 is successively carried out. As described above, the sheet of normal paper $102_b$ onto which pieces of metallic foil are attached has a microwave reflection factor by which the same detection signal $S_1$ as the predetermined value $L_a$ can be obtained. However, actually, due to the unevenness of the metallic foil and noise, the variable LF[CT] fluctuates in a range close to the predetermined value $L_a$. Therefore, the result of judgment in step SP7 fluctuates in accordance with the aforementioned fluctuation. However, in this period of time, the level of the detection signal $S_1$ is always higher than the level of the predetermined value $L_b$.

Accordingly, when it is judged to be "NO" in step SP7, the process directly advances to step SP12. However, even when it is judged to be "YES" in step 7, it is judged to be "NO" in step SP8, and the process advances to step SP12. After all, in either case, the process advances to step SP12, and each time step SP12 is carried out, the lamp carriage 106 is returned toward the origin by a predetermined distance. As described above, a difference between the predetermined values $L_a$ and $L_b$ is set at a value higher than an error caused by common noise.

Next, in the period of time after $t_9$, with respect to the variable LF[CT] corresponding to the document 102a to be prevented from forgery, the judgment in step SP7 is carried out. This variable LF[CT] is obtained by sampling the detection signal $S_1$ in the period of time (from time $t_1$ to time $t_2$) in which the optical semiconductor is excited. Accordingly, it is judged to be "YES" in step SP7. On the other hand, since the lamp 107 is put out at this point of time and the optical semiconductor is not excited, it is also judged to be "YES" in step SP8, and the process advances to step SP9.

In step SP9, the variable XCT is increased by an increment "1". Since the variable XCT has previously been reset at "0" in step SP1, the variable XCT becomes "1" when the step SP9 is first carried out. Next, when the process advances to step SP10, it is judged whether or not the variable XCT has reached a predetermined limit LIM. In the case where it is judged to be "NO" here, the process returns to step SP7 through steps SP12 and SP13.

According to the diagrams shown in FIGS. 11A to 11C, the variable LF[CT] corresponding to the document 102a to be prevented from forgery is necessarily not less than the predetermined value $L_a$, and the detection signal $S_1$ is necessarily not more than the predetermined value $L_b$. Accordingly, a loop composed of steps SP7 to SP10, and steps SP12 and SP13 is repeatedly carried out after that. Each time step SP9 is carried out, the variable XCT is increased by an increment "1", so that each time this step is carried out, the lamp carriage 106 is returned toward the origin by a predetermined distance. When the variable XCT exceeds LIM in a short time, the process advances to step SP11.

In this case, a command is outputted from CPU 120 to the main body control section 123 so that a countermeasure for preventing forgery can be taken. In this case, examples of the countermeasures for preventing forgery is: an image memory is flashed so that a blank sheet of paper can be outputted; a sheet of paper is painted out black; and a sheet of paper itself is not outputted. To sum up, any countermeasures may be adopted as long as the user can not get a normal copy. The reason why the countermeasure for preventing forgery is taken only when the variable XCT exceeds the limit LIM is to prevent the countermeasure from being taken due to dust adhered onto the document 102 or big noise carried by the detection signal $S_1$. Accordingly, it is preferable that the limit value LIM is determined to be a value by which securities of small sizes (for example, postage stamps) can be detected.

In this connection, when the documents 102 contain no documents to be prevented from forgery, the lamp carriage 106 returns to the origin while the variable XCT does not reach the limit value LIM. When step SP13 is carried out after that, it is Budged to be "YES", and the process advances to step SP14. In step SP14, CPU 120 gives a command to the main body control section 123 so that the image output can be conducted. When the main body control section 123 receives this command, printing operation is carried out on a sheet of paper according to image data stored in the image memory.

In this embodiment, the light source for reading documents is also used for the discrimination of documents to be prevented from the forgery. Of course, it is possible to provide a different light source to accomplish the present invention. In this case, the light source can be selected in accordance with documents to be prevented from the forgery. From this point of view, degree of freedom to prohibit copying can be increased.

As explained above, in the device for ascertaining the authenticity of an article to be inspected according to the present invention, the authenticity of an article to be inspected is ascertained according to the receiving levels in two states. One is a state in which the light source is turned on, and the other is a state in which the light source is turned off. Accordingly, it is difficult for a forger to forge the article to be inspected. Therefore, the authenticity of a forged article can be accurately discriminated.

Also, in the image forming apparatus according to the present invention, whether the article must be copied or not is judged by the receiving level in a condition in which the light is put on and also by the receiving level in a condition in which the light is put off. Accordingly, it is possible to accurately discriminate the article to be copied whether or not it is a document to be prevented from forgery.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A device for ascertaining the authenticity of an article, comprising:

a light source for emitting a beam of light to an article to be inspected;

electromagnetic wave generating means for emitting electromagnetic waves to the article;

electromagnetic wave receiving means for receiving the electromagnetic waves which are emitted from said electromagnetic wave generating means and reflected on and dispersed by or transmitted through the article, to output a signal corresponding to a receiving level of the received electromagnetic waves;

lighting control means for selectively turning on and off said light source; and judging means for judging the authenticity of the article according to (i) a comparison of the receiving level outputted from said electromagnetic wave receiving means when said light source set by said lighting control means is in a state where said light source is turned on to a first predetermined level, and (ii) a comparison of the receiving level outputted from said electromagnetic wave receiving means when said light source set by said lighting control means is in a state where said light source is turned off to a second predetermined level.

2. A device as claimed in claim 1, wherein the article comprises an optical semiconductor.

3. A device as claimed in claim 2, wherein said judging means judges the authenticity of the article according to a property of said optical semiconductor contained in the article that the electric conductivity of said optical semiconductor is increased according to the irradiation of the beam of light by said light source.

4. An image forming apparatus, comprising:
   a light source for emitting a beam of light to an article to be copied;
   electromagnetic wave generating means for emitting electromagnetic waves to the article;
   electromagnetic wave receiving means for receiving the electromagnetic waves emitted from said electromagnetic wave generating means and reflected on the article, to output a signal corresponding to a receiving level of the received electromagnetic waves;
   lighting control means for appropriately turning on and off the light source; and
   judging means for judging the authenticity of the article according to (i) a comparison of the receiving level outputted from said electromagnetic wave receiving means when said light source set by said lighting control means is in a state where said light source is turned on to a first predetermined level, and (ii) a comparison of the receiving level outputted from said electromagnetic wave receiving means when said light source set by said lighting control means is in a state where said light source is turned off to a second predetermined level.

5. An image forming apparatus as claimed in claim 4, wherein the article to be copied comprises an optical semiconductor.

6. An image forming apparatus as claimed in claim 5, wherein said judging means judges the authenticity of the article according to a property of said optical semiconductor contained in the article that the electric conductivity of said optical semiconductor is increased according to the irradiation of the beam of light by said light source.

7. A device for ascertaining the authenticity of an article, comprising:
   a light source for selectively emitting a beam of light to an article containing an optical semiconductor;
   electromagnetic wave generating means for emitting electromagnetic waves to the article;
   electromagnetic wave receiving means for receiving the electromagnetic waves which are emitted from said electromagnetic wave generating means and reflected on and dispersed by or transmitted through the article, to output a signal corresponding to a receiving level of the received electromagnetic waves; and
   judging means for judging the authenticity of the article according to the receiving level outputted from said electromagnetic wave receiving means, the authenticity of the article being judged based on (i) a comparison of the receiving level outputted when the light source emits a beam of light to the article to a first predetermined level, and (ii) a comparison of the receiving level outputted when the light source is not emitting a beam of light to the article to a second predetermined level.

8. A device for ascertaining the authenticity of an article according to claim 7, further comprising:
   lighting control means for selectively turning on and off said light source;
   wherein said judging means judges the authenticity of the article according to (i) the receiving level outputted from said electromagnetic wave receiving means when said light source set by said lighting control means is turned on, and (ii) the receiving level outputted from said electromagnetic wave receiving means when said light source set by said lighting control means is turned off.

9. A method of ascertaining the authenticity of an article, comprising:
   selectively emitting a beam of light to an article containing an optical semiconductor;
   emitting electromagnetic waves to the article when the beam of light is emitted to the article and when the beam of light is not emitted to the article;
   receiving the electromagnetic waves which are reflected on and dispersed by or transmitted through the article, to output a signal corresponding to a receiving level of the received electromagnetic waves; and
   judging the authenticity of the article according to the receiving level outputted, the authenticity of the article being judged based on (i) a comparison of the receiving level outputted when the beam of light is emitted to the article to a first predetermined level, and (ii) a comparison of the receiving level outputted when the beam of light is not emitted to the article to a second predetermined level.

10. A method as claimed in claim 9, further comprising:
    emitting electromagnetic waves to the article when the beam of light is prohibited from being emitted;
    receiving the electromagnetic waves which are reflected on and dispersed by or transmitted through the article when the beam of light is prohibited from being emitted, to output a signal corresponding to a receiving level of the received electromagnetic waves; and
    judging the authenticity of the article according to the receiving level outputted when the beam of light is emitted and when the beam of light is prohibited from being emitted.

11. A device as claimed in claim 1, wherein the first predetermined level is greater than the second predetermined level, and the judging means judges the article to be authentic when (i) the receiving level outputted from said electromagnetic wave receiving means when said light source is turned on is greater than the first predetermined level, and (ii) the receiving level outputted from said electromagnetic wave receiving means when said light source is turned off is less than the second predetermined level.

12. An image forming apparatus as claimed in claim 4, wherein the first predetermined level is greater than the second predetermined level, and the judging means judges the article to be authentic when (i) the receiving level outputted from said electromagnetic wave receiving means when said light source is turned on is greater than the first predetermined level, and (ii) the receiving level outputted from said electromagnetic wave receiving means when said light source is turned off is less than the second predetermined level.

13. A device as claimed in claim 7, wherein the first predetermined level is greater than the second predetermined level, and the judging means judges the article to be authentic when (i) the receiving level outputted from said electromagnetic wave receiving means when said light source emits a beam of light to the article is greater than the first predetermined level, and (ii) the receiving level outputted from said electromagnetic wave receiving means when said light source is not emitting a beam of light to the article is less than the second predetermined level.

14. A method as claimed in claim 9, wherein the first predetermined level is greater than the second predetermined level, and the article is judged to be authentic when (i) the receiving level outputted when a beam of light is emitted to the article is greater than the first predetermined level, and (ii) the receiving level outputted when a beam of light is not emitted to the article is less than the second predetermined level.

15. A device as claimed in claim 1, further comprising:

means for continuously conveying the article between a first position and a second position;

the electromagnetic wave receiving means including:

first electromagnetic wave receiving means disposed at the first position for receiving the electromagnetic waves which are emitted from said electromagnetic wave generating means and reflected on and dispersed by or transmitted through the article, to output a signal corresponding to a receiving level of the received electromagnetic waves; and second electromagnetic wave receiving means disposed at the second position for receiving the electromagnetic waves which are emitted from said electromagnetic wave generating means and reflected on and dispersed by or transmitted through the article, to output a signal corresponding to a receiving level of the received electromagnetic waves; and said light source being disposed at only one of the first position and the second position, and said light source continuously emitting a beam of light to the article when the article is disposed on the conveying means at the position of said light source.

16. A device as claimed in claim 4, further comprising:

means for continuously conveying the article between a first position and a second position;

the electromagnetic wave receiving means including:

first electromagnetic wave receiving means disposed at the first position for receiving the electromagnetic waves which are emitted from said electromagnetic wave generating means and reflected on and dispersed by or transmitted through the article, to output a signal corresponding to a receiving level of the received electromagnetic waves; and second electromagnetic wave receiving means disposed at the second position for receiving the electromagnetic waves which are emitted from said electromagnetic wave generating means and reflected on and dispersed by or transmitted through the article, to output a signal corresponding to a receiving level of the received electromagnetic waves; and said light source being disposed at only one of the first position and the second position, and said light source continuously emitting a beam of light to the article when the article is disposed on the conveying means at the position of said light source.

17. A method as claimed in claim 9, further comprising:

continuously conveying the optical semiconductor between a first position and a second position;

receiving the electromagnetic waves which are reflected on and dispersed by or transmitted through the article, to output a signal corresponding to a receiving level of the received electromagnetic waves when the article is disposed at the first position and at the second position; and emitting a beam of light to the article when the article is disposed at one of the first position and the second position, and not emitting a beam of light to the article when the article is disposed at the other of the first position and the second position.

* * * * *